A. L. PUTNAM.
VEHICLE WHEEL.
APPLICATION FILED JULY 17, 1916.
1,298,399.
Patented Mar. 25, 1919.
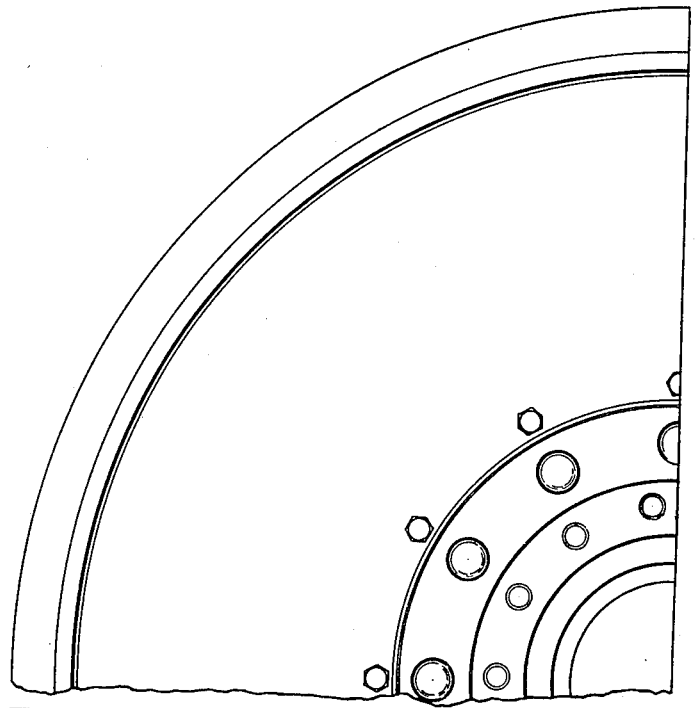
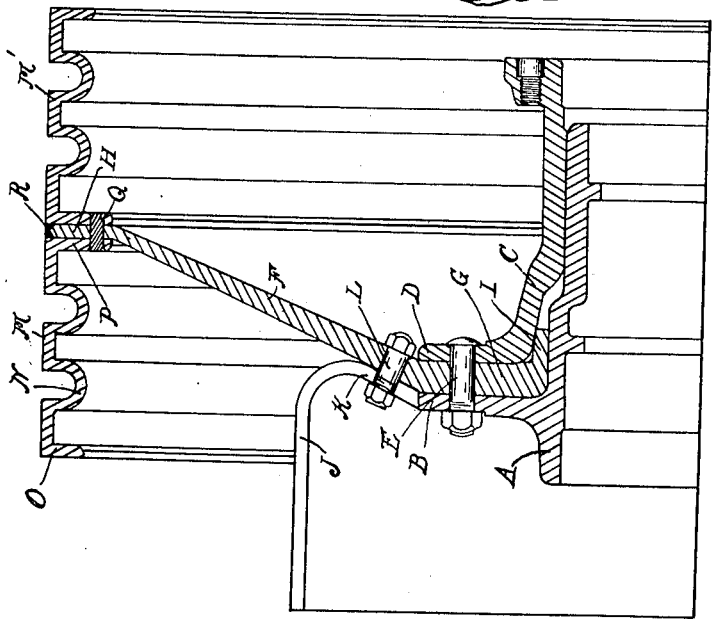
Inventor
Alden L. Putnam
By Whittemore Hulbert & Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

VEHICLE-WHEEL.

1,298,399.  Specification of Letters Patent.  Patented Mar. 25, 1919.

Application filed July 17, 1916.  Serial No. 109,701.

*To all whom it may concern:*

Be it known that I, ALDEN L. PUTNAM, a citizen of the United States of America, residing at Detroit, in the county of Wayne and State of Michigan, have invented certain new and useful Improvements in Vehicle-Wheels, of which the following is a specification, reference being had therein to the accompanying drawings.

The invention relates to vehicle wheels more particularly designed for use on trucks and in other places for carrying heavy loads. It is the object of the invention to obtain a construction which may be formed from pressed sheet-metal and rolled-metal parts, and which has all the requisite strength combined with relatively light weight.

In the drawings:

Figure 1 is a longitudinal section through a portion of the wheel;

Fig. 2 is an elevation thereof.

A is a hub, which may be of any suitable standard construction, being provided with an integral flange B. C is a sleeve member for engaging the hub, having a flange D parallel to the flange B and adapted to be clamped thereto by a series of bolts E. F is a pressed sheet-metal disk which is of a dished or conical form, having at its center a portion G parallel to the plane of rotation and adapted to be clamped between the flanges B and D. At the periphery the disk is provided with an annular portion H which is of lighter gage or thickness than the portion G and also is arranged in the plane of rotation. The conical portion which connects the portions G and H is of a tapering cross section so as to gradually change from the gage of the portion G to that of the portion H. There is also preferably an outwardly-pressed flange I on the portion D, which provides an increased surface of bearing upon the hub. J is the brake-drum which is pressed with an inwardly-extending conical flange K which is secured by bolts L to the disk F.

The construction is particularly adapted for the use of twin tires, and where so used is provided with twin tire - supporting rims which are clamped, riveted or otherwise secured upon opposite sides of the portion H. As shown, these twin rim sections M and M' are formed of suitably fashioned rolled stock, having the reinforcing beads or corrugations N therein, as well as the inwardly-extending edge flanges O and P. The inner flanges P are secured to the portion H of the disk, and in addition to securing rivets Q they are preferably welded at the periphery, as indicated at R, so as to form in effect an integral structure.

With the construction as described, the disk F by being formed of a properly tapered section, and by reason of its dished form, will constitute a strong and relatively light connection between the rim and the hub. At the same time the structure is one which can be manufactured at low cost.

What I claim as my invention is:—

A vehicle wheel, comprising a hub section provided with an outwardly-extending flange, a sleeve section engaging said hub having a parallel flange, a dished disk having its central portion clamped between said flanges and having an annular extension from said central portion engaging said hub section and sleeve section, and a rim peripherally secured to said disk.

In testimony whereof I affix my signature.

ALDEN L. PUTNAM.

Copies of this patent may be obtained for five cents each, by addressing the "Commissioner of Patents, Washington, D. C."